Oct. 28, 1941. R. C. TUTWILER 2,260,495
ILLUMINATING APPARATUS
Filed Nov. 22, 1940  6 Sheets-Sheet 2
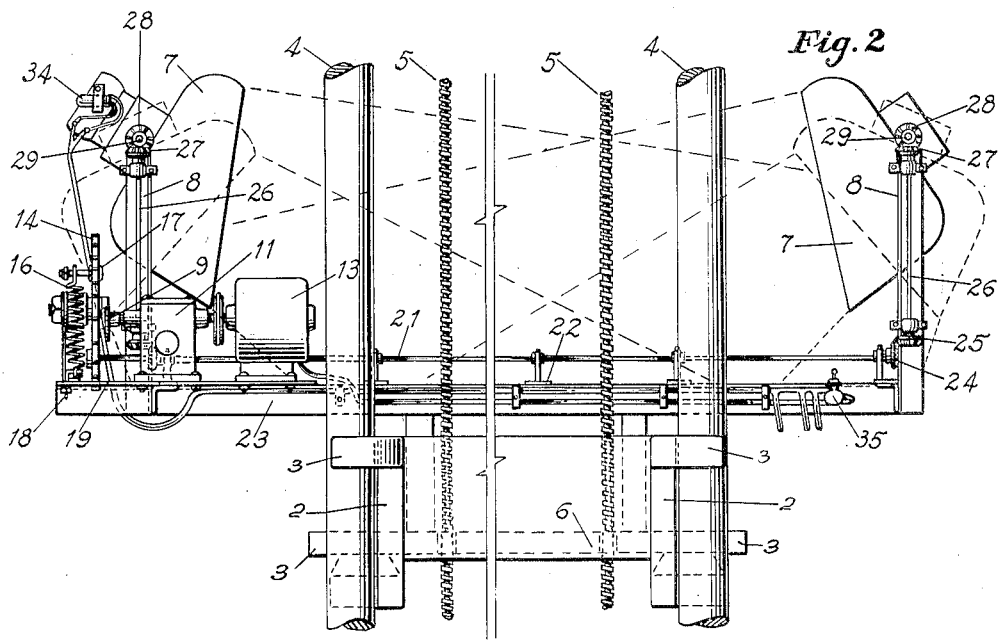
Fig. 2
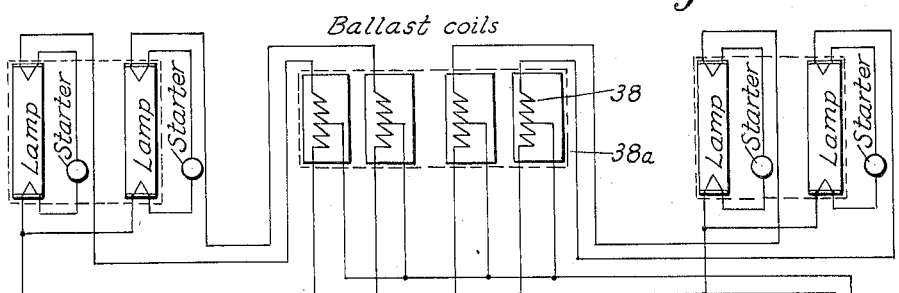
Fig. 3
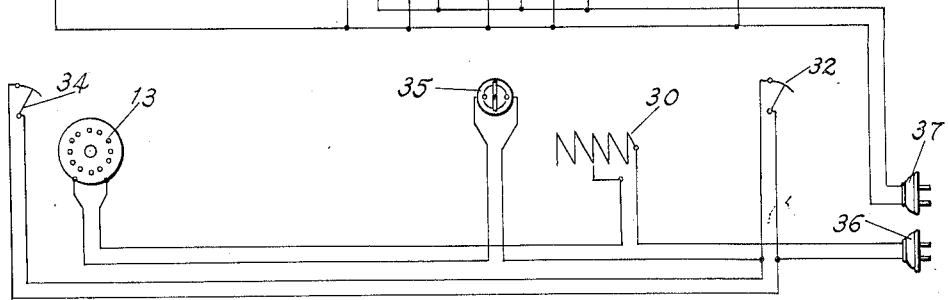
Inventor
Richard C. Tutwiler
By Ritter, Mechlin & Munis
his Attorneys Oct. 28, 1941.  R. C. TUTWILER  2,260,495
ILLUMINATING APPARATUS
Filed Nov. 22, 1940  6 Sheets-Sheet 3

Inventor
Richard C. Tutwiler
By Ritter, Needlen & Meins
His Attorneys

Oct. 28, 1941.  R. C. TUTWILER  2,260,495
ILLUMINATING APPARATUS
Filed Nov. 22, 1940   6 Sheets-Sheet 4

Inventor
Richard C. Tutwiler
By Ritter, Mechlin & Munn
his Attorneys

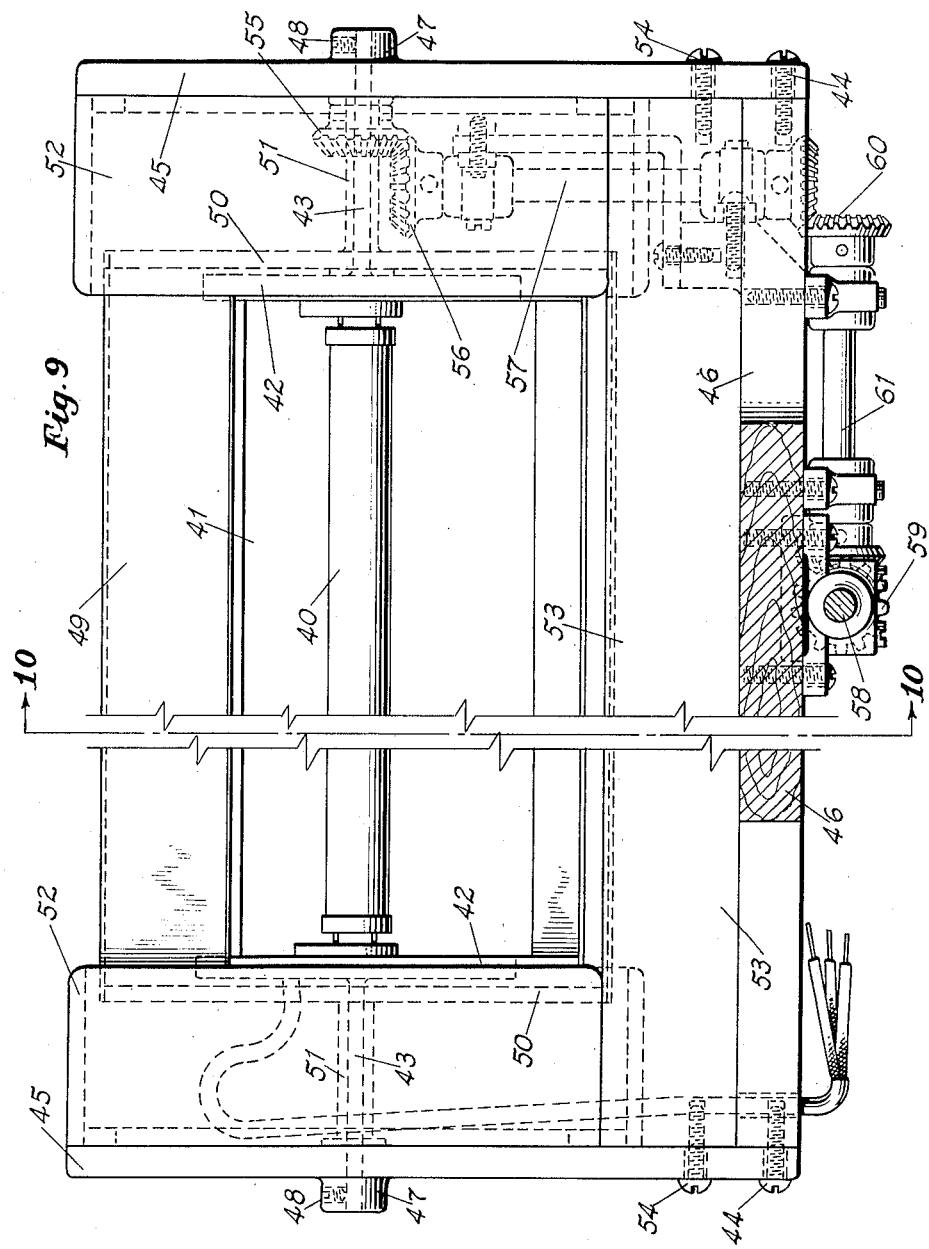

Oct. 28, 1941.  R. C. TUTWILER  2,260,495
ILLUMINATING APPARATUS
Filed Nov. 22, 1940  6 Sheets-Sheet 6
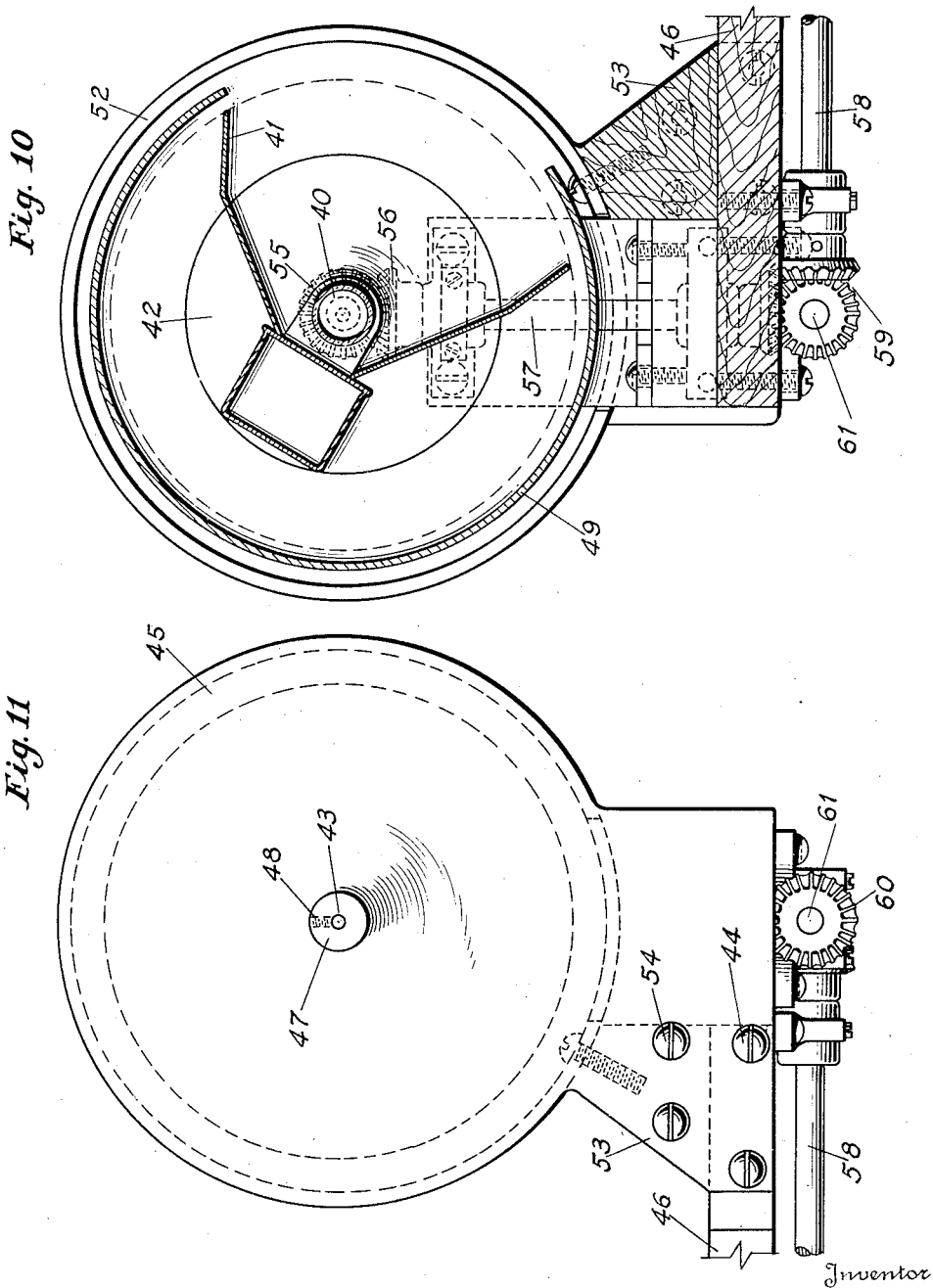

Patented Oct. 28, 1941

2,260,495

UNITED STATES PATENT OFFICE 2,260,495

ILLUMINATING APPARATUS

Richard C. Tutwiler, Richmond, Va.

Application November 22, 1940, Serial No. 366,781

10 Claims. (Cl. 240—1.3)

My invention relates to improvements in photographic and copy reproduction machines and more particularly to apparatus for illuminating the object to be reproduced.

The principal object of the invention is to provide an illuminating apparatus which is capable of obtaining, more effectively and efficiently than has heretofore been possible, a uniform distribution of light over the entire surface of the object to be reproduced.

Another object of the invention is to provide an illuminating apparatus which need not be adjusted to compensate for a change in the distance between the object to be reproduced and the camera lens and which nevertheless will enable the entire surface of the object to be reproduced to receive substantially the same number of lumens per unit of time from the source of light.

A primary feature of the invention consists in providing the illuminating apparatus with movable means for causing the light to progressively fall on different areas of the exposed surface of the object to be reproduced and with mechanism for moving the movable means at varying speeds to cause each unit or area of the exposed surface of the object to receive approximately the same number of lumens per unit of time from the source of light.

A further feature of the invention consists in providing movable means for causing light from a suitable source to sweep over the exposed surface of the object to be reproduced and in causing said means to move at varying speeds first in one direction and then in the opposite direction so as to cause the light to fall for a greater period of time on portions of the surface of the object which are farthest from the light source than on portions of the surface which are nearest the light source.

A further and more specific feature of the invention consists in arranging a pair of lamps adjacent opposite sides of the mounting board on which the object to be reproduced is placed and in providing each of the lamps with a reflector which is movable in one direction at an increasing rate and which is movable in the opposite direction at a decreasing rate so that the light from the lamps will fall for a less period of time on those areas of the surface of the object where the intensity of the light is greatest than on those portions of the surface where the intensity of the light is not so great.

Other and more specific features of the invention, residing in advantageous forms, combinations and relations of parts, will hereinafter appear and be pointed out in the claims.

In the drawings, illustrating preferred embodiments of the invention:

Figure 2 is an end elevation of the illuminating apparatus and mounting board, adjacent parts of the photographic and copy reproduction machine being shown in elevation.

Figure 3 is a diagram of the electrical parts and wiring of the illuminating apparatus.

Figure 9 is a longitudinal sectional view through the mounting board showing in side elevation a modified form of lamp assembly.

Figure 10 is a detail sectional view taken on line 10—10 of Figure 9.

Figure 11 is a side elevational view of the lamp assembly shown in Figure 9.

Figure 1:
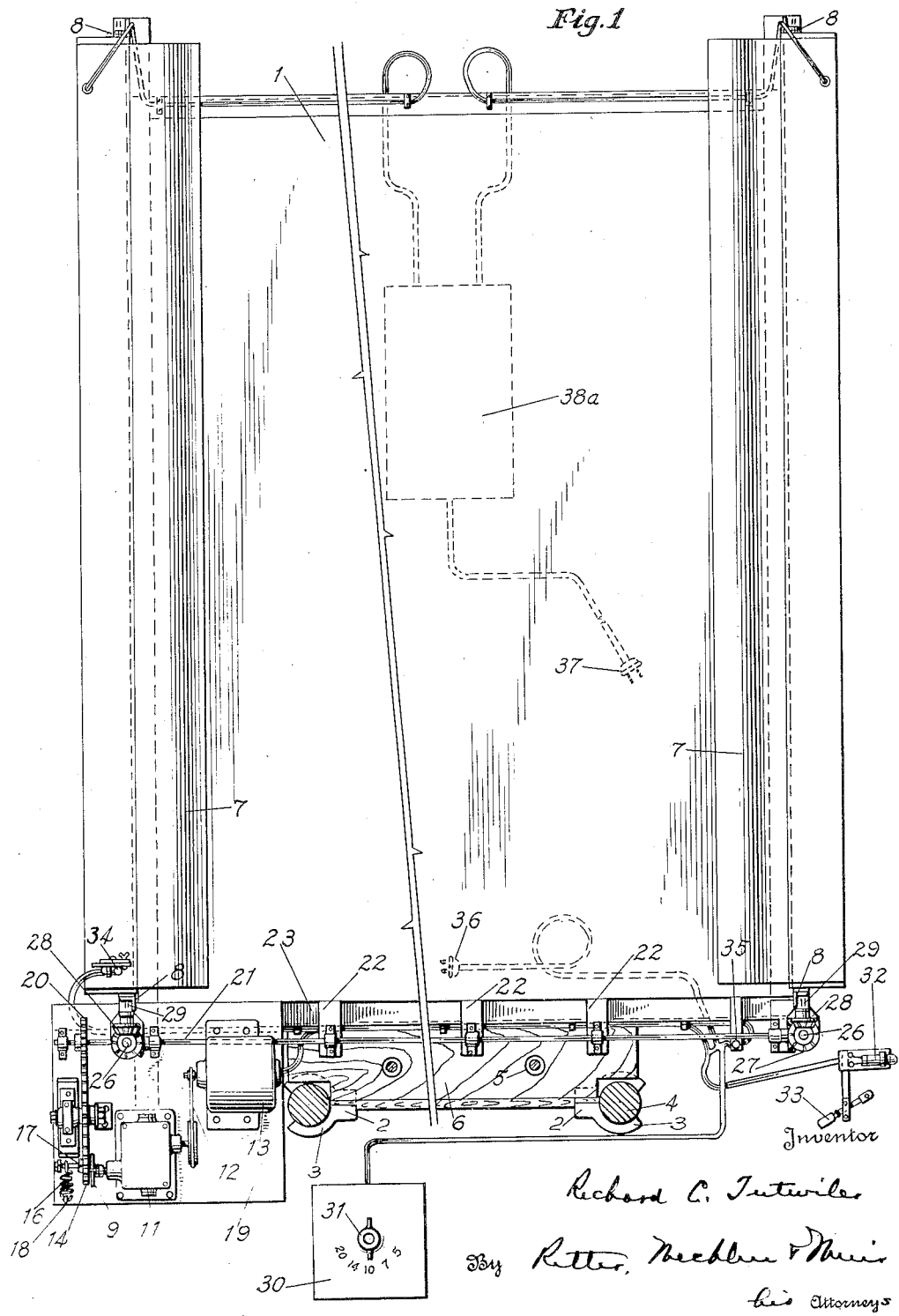
Figure 1 is a plan view of the illuminating apparatus as applied to a mounting board of a conventional type of photographic or copy reproduction machine, only such parts of the machine being shown as are requisite to an understanding of the manner in which the mounting board is movably associated therewith.

Referring more particularly to the drawings, I indicates the mounting board of a photographic or copy reproduction machine which, to permit of its vertical adjustment with respect to the camera lens (not shown) of the machine, is provided adjacent its inner edge with a pair of brackets 2 each of which is formed with vertically spaced arms 3 respectively arranged on opposite sides of a guide post 4 of the machine. Vertical adjustment of the board is commonly effected by a pair of screw members 5 which have threaded engagement with suitable means carried on a cross arm 6 connecting the brackets 2.

Disposed a short distance above the mounting board along opposite sides thereof are lamps to provide the illumination for the object which is placed on the board for reproduction. While any number or type of lamps may be arranged on each side of the board, I have found fluorescent lamps to give the best illumination and for a machine having a mounting board approximately four feet long and three feet wide, two lamps may be conveniently used on each side of the board.

The lamps on each side of the board are housed within reflectors 7 respectively rotatably mounted on the upper ends of angle bars 8 which are rigid with the board and project upwardly from adjacent the corners thereof. By mounting the lamps directly on the board instead of on separate supports independent thereof as is the present general practice, the board and lamps are movable together vertically as a unit to increase or decrease the distance between the object to be reproduced and the camera lens to effect a change in the size of the reproduction.

So that there will be even light strength and exposure in lumens per second on the entire surface of the object to be reproduced, mechanism is provided for oscillating the reflectors to cause the light from the lamps to move or sweep back and forth across the surface of the object. As the surface of the object has portions disposed at unequal distances from the lamps, it is necessary for the portions of the surface which are farthest removed from the lamps to be subjected to light for a longer period of time than the portions of the surface which are nearest the lamps. The actuating mechanism for the reflectors therefore includes means whereby they are moved at a decreased rate when the reflectors are directing the light from the lamps on portions of the surface of the object remote from the lamps and at an increased rate when light is caused to flow on portions of the surface which are nearest the lamps.

In the present embodiment of the invention, the mechanism for imparting the desired movement to the reflectors includes a rotatable cam 9 which is keyed to a driven shaft 10 of a gear reduction unit 11 to which motion is transmitted by any suitable means, such as a belt 12 from any desired source of power, such as an electric motor 13. The cam 9 imparts an oscillating motion to a relatively large gear wheel 14 by means of a roller 15 which is carried by the gear wheel and is at all times yieldingly maintained in contact with the periphery of the cam by an adjustable tension spring 16, one end of which is connected as at 17 to the gear wheel and the other end of which is connected to an adjustable bracket 18 secured to a platform 19 which is carried by the mounting board 1 and affords a support for the motor and other parts of the operating mechanism for the reflectors. As the roller 15 is yieldingly maintained in engagement with the periphery of the cam 9, it will, of course, be appreciated that the gear 14 is first caused to move in one direction and then in the opposite direction. Meshing with the gear wheel 14 is a relatively small gear wheel 20 which is mounted adjacent one end of a shaft 21 which extends along the inner edge of the mounting board from one side thereof to the other. The shaft 21, which is journaled in suitable bearings carried by brackets 22 secured to an angle iron 23 bounding the inner edge of the mounting board, is provided adjacent its opposite ends with bevel gears 24 which respectively mesh with bevel gears 25 secured to the lower ends of vertical shafts 26 respectively mounted on the upright angle bars 8 at the inner corners of the mounting board. The upper ends of the vertical shafts 26 are each provided with a bevel gear 27 meshing with a bevel gear 28 carried by a shaft 29 which is rigid with the associated reflector and is journaled in the upper end of the adjacent upright supporting angle bar 8.

By virtue of these connected shafts and gears, the oscillatory motion which is transmitted to gear 14 is transmitted to the smaller gear 20 and, in turn, imparted to each of the reflectors 7. The light from the lamps is, therefore, caused to sweep back and forth across the surface of the object to be reproduced and the gear connection between shaft 21 and the two vertical shafts 26 is such that the reflectors are caused to move simultaneously in opposite directions.

The shape of cam 9 is such that, when the reflectors move toward each other to direct the light rays on those portions of the surface of the object to be reproduced which are most remote from the lamps, they are caused to move at a decreasing rate, and when moving in the opposite direction the reflectors are caused to move at an increasing rate. Thus the portions of the surface to be reproduced which are remote from the lamps are subjected to the light rays for a longer period of time than the portions of the surface nearest the lamps.

The particular shape of the cam depends upon the type of fixture or reflector used but for each type the degree of eccentricity of each increment of surface of the cam to produce the desired change in rate of movement of the reflectors may be easily determined by plotting a curve based on the variations in the intensity of the light from one side of the board to the other. With this curve as a basis, it may be readily determined how long each portion of the surface to be reproduced must be subjected to the light rays in order that each portion may receive the same number of lumens per second. With this information, those skilled in the art may without difficulty provide the cam with the surface which is necessary to cause the requisite variation in rate of movement of the reflectors to produce the result desired.

The motor 13 is wired through an adjustable hand regulator 30 to control its speed and that of the reflectors. A dial is preferably provided in conjunction with the adjustable handle 31 to show the number of seconds required for one complete cycle of operation of the reflectors.

To set the motor in operation at the same time the camera shutter is opened, a mercury switch 32 may be conveniently provided in the motor circuit, the switch being movable to close the circuit by an arm 33 which is responsive to movement of the camera shutter. So that the reflectors will complete their cycle of operation and return to the positions from which they started regardless of subsequent opening or closing of switch 32 on the camera shutter, another mercury switch 34 is included in the motor circuit in parallel with switch 32. Switch 34 is mounted on one of the reflectors in such manner that, when the reflector is in its normal at rest position, the switch is open but as soon as the reflector starts moving the switch is closed and remains closed until the reflector has completed its cycle of operation and returns to its starting position.

A manually operable switch 35 is also included in the motor circuit in series with the motor to enable the operator to stop the reflectors at any point or position he desires for focusing and checking the object on the ground glass screen of the camera and also for making any other adjustments which may be necessary.

As it is frequently desirable to have the lights on when the motor is not in operation, the lights are preferably on a circuit entirely separate from the motor circuit. A plug by which the motor circuit may be connected into a suitable supply is indicated by the reference numeral 36 and a corresponding plug for the lighting circuit is indicated by the reference numeral 37. The ballast coils 38 which are required for the fluorescent lamps may be housed in a suitable ventilated sheet iron box 38a mounted on the under side of the mounting board.

Instead of moving the lamp reflectors to enable all portions of the object to be reproduced to receive substantially the same number of lumens per unit of time the same results can be obtained with stationary reflectors and by employing an opaque screen which is movable back and forth between the source of light and the object to be reproduced. Thus in the form of the invention shown in Figures 9, 10 and 11, the fluorescent tube 40 is provided with a stationary reflector member having reflector plates 41 which are secured to end plates 42 provided with axles 43, the outer ends of which are respectively journaled in plates 45 which are connected by screws 44 for example to opposite sides of the mounting board 46. Surrounding the openings in the plate 45 into which the axles 43 extend are bosses 47 each of which is provided with a set screw 48 adapted to engage the axles 43 so as to maintain the reflector member in a desired position of adjustment.

Surrounding the reflector and lamp is a tubular-like opaque screen 49 having end plates 50 and a longitudinally arranged slot or opening which extends from one end plate to the other. The tubular member is rotatably mounted on the axles 43 by providing the end plates 50 with oppositely projecting hollow shafts 51 which surround the axles. Enclosing the space between each end plate 45 and the adjoining end of the tubular screen 49 are end caps 52 which are mounted on and secured to a cross bar 53 which rests on the mounting board 46 and is secured at its ends by screws or the like 54 to the end plates 45.

For rotating the tubular screen 49, one of the shafts 51 thereof is rigidly provided with a bevel gear 55 which meshes with a bevel gear 56 on the upper end of a vertical shaft 57 which is adapted to be driven by a main drive shaft 58 through the intermediacy of two sets of bevel gears 59 and 60 respectively and a connecting shaft 61. The main drive shaft 58 corresponds with the shaft 21 of the preferred embodiment of the invention and it is adapted to be driven in the same manner as that shaft by the same character of actuating mechanism which has heretofore been fully described.

The opening or slot in the screen surrounding the reflector and fluorescent lamps is sufficiently wide to permit the light rays from the lamps to fall on the entire surface of the object to be reproduced and, when the screen is at rest, it should occupy a position such that it will not intercept light rays which would otherwise fall on the object. The driving connection between the screen and the actuating mechanism is such as to cause the screen to rotate in a counter-clockwise direction as viewed in Figure 10. By moving in this direction, the screen will first intercept light rays falling on those portions of the object to be reproduced which are nearest the lamp and which are, therefore, subject to the most intense light. As the screen moves in a counter-clockwise direction, its rate of movement gradually decreases until its starts to move in the opposite direction, at which time its rate of movement will gradually increase.

Figure 4:
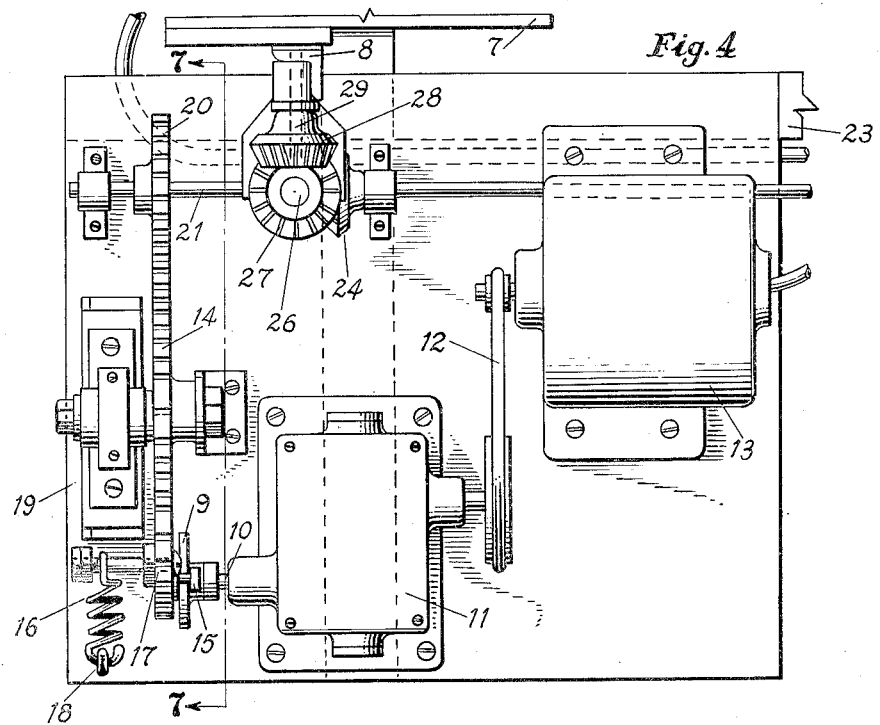
Figure 4 is an enlarged plan view of the operating mechanism of the illuminating apparatus as viewed in the lower left hand corner of Figure 1.
Figure 5:
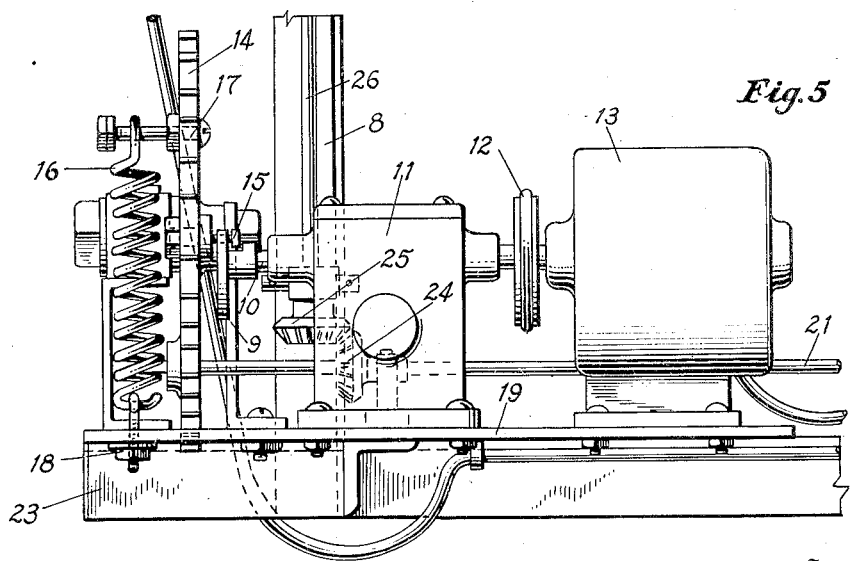
Figure 5 is an enlarged end elevational view of the operating mechanism of the apparatus as viewed in Figure 2.
Figure 6:
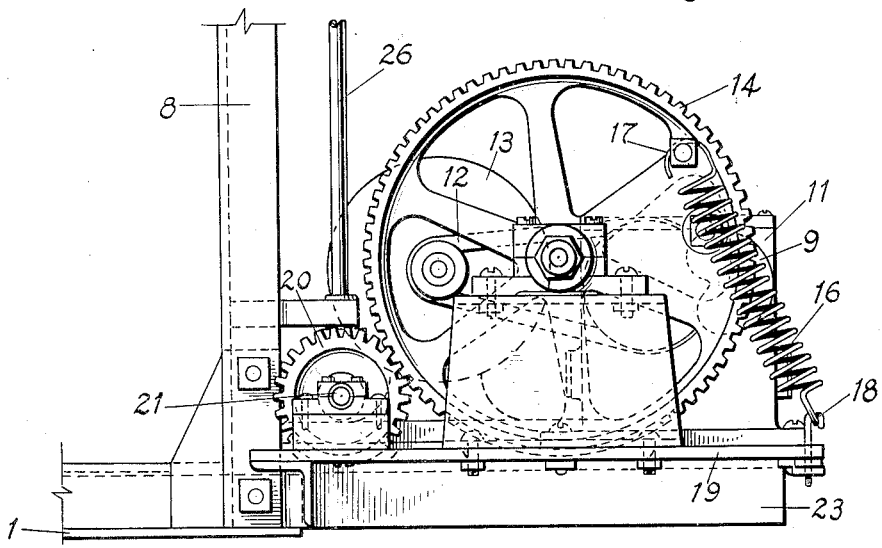
Figure 6 is an enlarged side elevational view of the operating mechanism as viewed from the left hand side of Figure 1.
Figure 7:
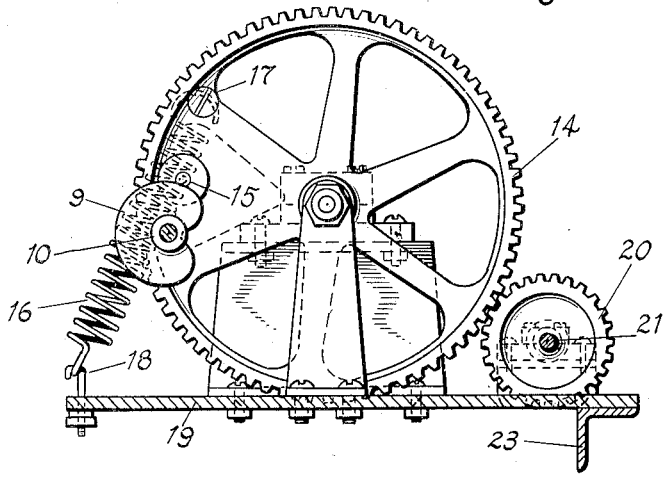
Figure 7 is an enlarged sectional view taken on line 7—7 of Figure 4.
Figure 8:
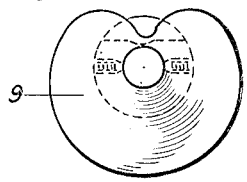
Figure 8 is a detail view of the operating cam.

It will thus be perceived that the opaque screen in the form of the invention illustrated in Figures 9, 10 and 11 will operate in the same manner as the movable reflectors of the form of the invention illustrated in Figures 1 to 8, inclusive, to cause all portions of the surface of the object to be reproduced to receive a uniform light exposure. While only one lamp assembly has been shown in Figures 9, 10 and 11, it is, of course, to be understood that two such assemblies are preferably intended to be employed, being arranged with respect to the mounting board in substantially the same manner as the light units illustrated in the other figures of the drawings.

It will be appreciated that various modifications and changes may be made in the structural details of the constructions herein disclosed without departing from the spirit and scope of the invention as defined in the appended claims.

What I claim is:

1. An illuminating apparatus for photographic and copy reproduction machines, including a source of light for illuminating an object to be reproduced having portions of its exposed surface at varying distances from said source, movable means for causing light from said source to sweep over the exposed surface of the object, and mechanism for moving said means at varying speeds in one direction and then in the opposite direction to cause the light to fall for a greater period of time on portions of the surface of the object which are farthest from the light source than on portions of the surface which are nearest the light source.

2. An illuminating apparatus for photographic and copy reproduction machine including a source of light for illuminating an object to be reproduced which has portions of its exposed surface at unequal distances from said source, movably mounted means associated with said source of light for causing the light to progressively fall on different areas of the exposed surface of said object, and mechanism for moving said means at varying speeds to cause each unit of area of the exposed surface of said object to receive approximately the same number of lumens per unit of time from said source of light.

3. An illuminating apparatus for photographic and copy reproduction machines including a source of light for illuminating an object to be reproduced which has portions of its exposed surface at unequal distances from said source, means movable first in one direction and then in the opposite direction for causing light from said source to move back and forth over the exposed surface of said object, and mechanism for moving said means at a decreasing rate in one direction and at an increasing rate in the opposite direction to cause the light to fall on different areas of the exposed surfaec of said object for times varying directly with the distance between the source of light and the respective areas.

4. An illuminating apparatus for photographic and copy reproduction machines having a mounting board on which is placed the object to be reproduced, said apparatus including a pair of lamps adapted to be disposed adjacent opposite sides of the board for illuminating the exposed surface of said object, movably mounted means associated with each of said lamps for causing light therefrom to fall upon different areas of the said surface for times respectively varying with the distance between said lamp and said areas, and mechanism for moving each of said movable means at varying speeds whereby the light from the lamps will fall for a less period of time on those areas of said surface where the intensity of the light is greatest than on those portions of the surface where the intensity of the light is not so great.

5. An illuminating apparatus for photographic and copy reproduction machines including a lamp for illuminating an object to be reproduced which has portions of its exposed surface at unequal distances from said lamp, a reflector for the lamp, said reflector being rotatable so as to cause the light from the lamp to fall upon different areas of the exposed surface of the object for varying times, and mechanism for moving said reflector at varying speeds so as to cause the light from the lamp to fall for a greater period of time on portions of the surface of the object which are farthest from the lamp than on portions of said surface which are nearest the lamp.

6. An illuminating apparatus for photographic and copy reproduction machines having a mounting board on which is placed the object to be reproduced, said apparatus including a pair of lamps adapted to be disposed adjacent opposite sides of the board for illuminating the exposed surface of said object, a reflector for each lamp, said reflectors being movably mounted for causing the light from each lamp to sweep over the exposed surface of said object, and mechanism for simultaneously moving said reflectors including means for causing each reflector to move at varying speeds whereby all portions of the exposed surface of said object receive approximately the same number of lumens per second from said lamps.

7. An illuminating apparatus for photographic and copy reproduction machines having a mounting board on which is placed the object to be reproduced, lamps arranged at opposite sides of said board for illuminating the exposed surface of said object, a plurality of movable means respectively associated with said lamps for causing the light from each to sweep back and forth across the exposed surface of the object, and mechanism for simultaneously moving said means in opposite directions and for causing each means to move at varying speeds so that the light from said lamps will fall for a less period of time on those portions of the surface of the object where the intensity of the light is greatest than on those portions of the surface where the intensity of the light is not so great.

8. An illuminating apparatus for photographic and copy reproduction machines of the type having a mounting board which is movable toward and away from a camera shutter and on which the object to be reproduced is placed, said apparatus including a source of light mounted adjacent a side of said board for illuminating the exposed surface of said object, movable means for causing the light from said source to sweep back and forth across said surface, said means having a cycle of operation involving a period of movement in one direction at an increasing rate and a period of movement in the opposite direction at a decreasing rate, and mechanism for actuating said means including a motor, switch means for setting said motor in operation, and means operable upon movement of said movable means for rendering said switch means ineffective to further control the operation of said motor until said movable means has completed its cycle of operation.

9. An illuminating apparatus for photographic and copy reproduction machines including a source of light for illuminating an object to be reproduced which has portions of its exposed surface at unequal distances from said source, means movable between the source of light and the exposed surface of the object to cause the light from said source to fall upon different areas of said surface for varying periods of time, and mechanism for moving said movable means at varying speeds so that the light from said source will fall for a less period of time on portions of the surface of the object which are nearest the light source than on portions of the surface which are remote from the light source.

10. An illuminating apparatus for photographic and copy reproduction machines including a source of light for illuminating an object to be reproduced which has portions of its exposed surface at unequal distances from said source, means movable back and forth between the source of light and the exposed surface of the object for causing the light to progressively fall on different areas of said surface for varying times, and mechanism for causing said means to move at an increasing rate in one direction and at a decreasing rate in the opposite direction so that the light will fall for a less period of time on those portions of the surface of the object where the intensity of the light is greatest than on those portions of the surface where the intensity of the light is not so great.

RICHARD C. TUTWILER.